(12) United States Patent
Marrie

(10) Patent No.: US 6,381,508 B1
(45) Date of Patent: Apr. 30, 2002

(54) PROCESS AND EQUIPMENT FOR OPTIMIZING PRODUCTION

(76) Inventor: Stéphane Marrie, 21 A, rue Victor-Hugo, F-42400, Saint-Chamond (FR)

( * ) Notice: Subject to any disclaimer, the term of this patent is extended or adjusted under 35 U.S.C. 154(b) by 0 days.

(21) Appl. No.: 09/172,850

(22) Filed: Oct. 15, 1998

Related U.S. Application Data

(63) Continuation of application No. PCT/FR97/00671, filed on Apr. 15, 1997.

(51) Int. Cl.$^7$ .......................... G06F 19/00; G05B 9/02; H02H 3/04
(52) U.S. Cl. .......................... 700/96; 700/80; 700/110; 714/25; 714/48
(58) Field of Search .......................... 700/80, 81, 103, 700/104, 108, 110, 96, 79; 714/25, 47, 48

(56) References Cited

U.S. PATENT DOCUMENTS

| | | | | |
|---|---|---|---|---|
| 5,159,673 A | * | 10/1992 | Sackmann et al. | 709/216 |
| 5,216,612 A | * | 6/1993 | Cornett et al. | 700/96 |
| 5,327,349 A | * | 7/1994 | Hoste et al. | 700/110 |
| 5,347,449 A | * | 9/1994 | Meyer et al. | 700/80 |
| 5,353,238 A | * | 10/1994 | Neef et al. | 702/184 |
| 5,420,977 A | * | 5/1995 | Sztipanovits et al. | 345/356 |
| 5,617,321 A | * | 4/1997 | Frizelle et al. | 700/104 |
| 5,914,875 A | * | 6/1999 | Monta et al. | 700/79 |
| 6,128,543 A | * | 10/2000 | Hitchner | 700/108 |

FOREIGN PATENT DOCUMENTS

| | | |
|---|---|---|
| EP | 0 467 257 | 1/1992 |
| EP | 0 482 523 | 4/1992 |
| EP | 0 660 210 | 6/1995 |

* cited by examiner

*Primary Examiner*—William Grant
*Assistant Examiner*—Paul Rodriguez
(74) *Attorney, Agent, or Firm*—Arent Fox Kintner Plotkin & Kahn, PLLC

(57) ABSTRACT

A process and equipment for optimizing production includes identifying the breakdown that is actually responsible for a shutdown on a machine production line, and hence of introducing this specific criterion into the process for handling malfunctions, at the level of a man-machine interface. Thus, the true cause of a given breakdown is determined, and it becomes possible to act on this primary cause, and not just on the secondary breakdowns generated downstream; therefore productivity control is improved considerably.

6 Claims, No Drawings

PROCESS AND EQUIPMENT FOR OPTIMIZING PRODUCTION

This is a continuation application, filed under the provisions of under 35 U.S.C. 120 and claims priority from copending parent application International Application No. PCT/FR97/00671 filed Apr. 15, 1997, the contents of which are incorporated herein by reference.

The present invention relates to the technical field of industrial production, and more particularly of the productivity of "machine" lines.

In industry, machines are controlled by a "programmable logic controller" (PLC), which controls certain functions of the machine. The PLC receives orders from the operator via, in the simplest configurations, a control panel.

In the prior art, "man-machine" interfaces have been devised whose function is to translate complex operations and functions of the PLC, and hence of the machine, into simple functions and manipulations. Thus, the complex functions become accessible to the operator and/or the latter executes or controls them more quickly.

Among the known interfaces are those which include the display of machine breakdowns and machine states, as well as those offering, for example, a debugging aid, which can include a diagnostic help function.

Also known are audit lists or "checklists," computer-aided maintenance of the machine, which is an external function that makes it possible to issue intervention orders for any part suspected through analysis of being liable to become defective within a given time period (so-called preventive maintenance), and the so-called conditional maintenance that occurs when a critical threshold is reached (vibrations, oil quality, frequency of breakdowns, etc.), which triggers an intervention.

It is possible, according to a first aspect of the invention, to classify breakdowns according to different methods.

For example, it is possible to differentiate
 the non-critical alarm messages (prevention of the breakdown),
 the critical alarms that result in a machine shutdown, with attribution of the down time to the breakdown involved,
 the so-called reset breakdowns which, because of their seriousness and/or because of the moment in which they occur, require the resetting of one full operation on a production line (for example, a restart of the entire sterilization operation),
 and the breakdowns known as "going down," which make it necessary to restart the entire production, that is, to restart all of the operations preliminary to a production start, with a potential loss of production in the case of a fragile product, a breakdown of a cold chain, etc.

According to this first aspect, it is therefore possible to classify breakdowns according to various systems, identify them, and construct algorithms for handling every type or group of breakdowns.

"Breakdown" is intended herein to mean any machine incident of any importance, whether capable or incapable (examples of "undocumented" breakdowns), as desired by the designers, of generating an "alarm."

"Alarm" is understood to mean any signal generated by a "breakdown" for the purpose its being handled.

"Machine" or "machine line" or "production," etc., is intended herein to mean any type of industrial or semi-industrial production comprising a certain degree of automation and an alarm management system, or capable of being so equipped, in any type of industry.

There is also a known system for optimizing productivity known as "TPM" or "Total Production Maintenance," a complete maintenance system at the production level, which generally distinguishes between two types of breakdowns, chronic breakdowns (those that occur with substantial frequency), and unexpected breakdowns (which are rare, but costly in terms of machine down time). Although very useful, and more complex than described above, this system, like others, is limited to a statistical handling of breakdowns and to the initiation of certain preventive or reparative actions.

These known systems can be more or less sophisticated, but they have a common point, which is that they do not assist in the precise AND automatic calculation of productivity.

In fact, in their algorithms, these systems identify a breakdown, classify it into one of the categories that have been imposed on them, and attributes the machine down time (or any other indication of production disruption) to this breakdown.

From this attribution follow statistical calculations and recommendations for actions such as the replacement of a certain part, diagnoses of normal or abnormal wear, etc.

It is therefore a very systematic approach that is limited to determining actual states such as a breakdown, and to performing calculations resulting from these actual states.

According to the invention, what is proposed is a production control system that integrates into the breakdown handling module a step for recognizing the initial or primary breakdown of a downstream or secondary breakdown having resulted in an alarm.

According to the invention, the machine down time is attributed to the primary breakdown. Thus, the derived calculations direct actions to the primary or "real" causes of the breakdowns, and no longer to their visible, but "secondary" effects, which would not have been produced without the occurrence of the primary breakdown.

Hence, a certain "culpability" criterion is assigned to each breakdown, possibly with weighting coefficients that are within the scope of one skilled in the art, on each type of machine line.

As an example, let us consider a rolling bearing whose lubrication is obviously controlled, for example by means of a sensor of the flow of lubrication fluid. Let us accept the hypothesis that this sensor stops functioning; therefore a "pressure sensor breakdown" is issued. A temperature alarm threshold will also be crossed if the security system has been well designed, issuing a second, "temperature sensor breakdown."

If, for the restart, it is necessary to operate a panel, etc., that is also being monitored (access panel, electric switch, etc.), third or fourth alarms are registered by the system. If the overall reaction is too slow, a mechanical failure can occur, for example the deformation of an overheated mechanical element: fifth alarm.

In the standard systems, each alarm is simply treated as such, and the down time is attributed to it. Thus, the maintenance operator is informed of two, three, four or five breakdowns caused by only one breakdown, the first. The statistical calculations are correct, but their interpretation is wrong; thus, in the above example, the statistics could suggest that the design of the mechanical element should be reviewed, whereas only the pressure sensor should have been implicated.

This results in erroneous diagnoses and predictions of wear, and therefore in totally unnecessary or largely premature interventions, while the main cause is not eliminated, or at least not quickly enough.

This results in a decrease in productivity which could have been avoided. The invention, by assigning a "primary responsibility" criterion to a breakdown, makes it possible to pinpoint the breakdowns that must really be handled, and to eliminate from the statistics the breakdowns that did not occur spontaneously. Thus, the manager can order the handling of the main causes of breakdowns, and no longer order useless interventions.

Thus, a productivity gain threshold is crossed, since the invention does not involve a more or less marginal improvement in the sophistication of an algorithm, and hence a more or less substantial refinement of its calculations, but operates according to a radically different concept, which is to handle only the breakdowns whose handing is useful.

Full automation of the monitoring of an operation is also obtained.

The practical embodiment of the invention, being based on the above concept, therefore requires an algorithm that recognizes the links between the various elements "under control." Herein, an element under control designates any part, any sensor, etc., for which the designer of the machine, in accordance with his plan for security and production control, wishes its failure to trigger an alarm.

In the above example, the algorithm must therefore know that if the fluid pressure is abnormal, the temperature sensor will display an abnormal value (with a reaction time that is itself calculable by means of an algorithm) which will trigger an alarm; that it is necessary to replace the sensor by opening a panel under control, which will then issue an alarm. With this knowledge, the system will attribute the machine down time to only one breakdown, that of the sensor. The manager will therefore concern himself with neither the temperature aspect nor the panel, but only with the pressure sensor.

Naturally, coefficients should be assigned. In the above example, it would be possible to assign 90% of the time to the pressure sensor, 2% to the panel (since wear in case of opening should be integrated into the preventive maintenance program) and 8%, not to the temperature sensor but to the mechanical element, which may have overheated, even if briefly; this overheating must also be integrated into the preventive maintenance of this element.

One skilled in the art will understand that it is impossible to provide all of the possible examples.

The invention, in the form of a fully automated system for monitoring an operation, comprising interconnected logical systems, therefore comprises three essential elements or modules:

1. A module for knowledge of "machine" interactions of any type, capable of having repercussions at the level of the breakdowns, between the elements under control.
2. A module for recognizing, for each breakdown, the primary breakdown, from the information contained in Module 1.
3. A module for attributing the down time (or any other element of evaluation chosen) to the primary breakdown and possibly, with the appropriate coefficients, to the other elements under control which, as a result of the primary breakdown, have either triggered an alarm, or have necessarily been affected by one of the primary or secondary breakdowns, even though they have not generated alarms themselves.

It is understood that, as a function of the degree of sophistication chosen, the module 1 could know the interactions between all of the elements under control, or only between some of these elements, for example those capable of causing the most costly machine shutdowns. "Knowledge" is understood to mean that the functional links of the machine will be entered into a data bank of the system. For each element under control, the system therefore knows the functional layout, upstream line, and downstream line, and can determine whether the source of the breakdown is internal or external.

It is also understood that the (weighting) coefficients are determined as a function of the potential seriousness of the breakdown of the element, and of the characteristics of this element.

In both cases, the designer will make choices as a function of the machine or machine line and the sophistication desired.

Naturally, the three essential modules according to the invention could be part of a larger system, and be interconnected by known mechanical, electrical or electronic means.

The modules according to the invention are constituted by elements and logical systems whose structure and layout are known and are within the scope of one skilled in the art.

The invention also relates to a process for optimizing production, particularly on "machine" lines, characterized in that it comprises three steps:

1. knowledge of "machine" interactions of any type, capable of having repercussions at the level of the breakdowns, between the elements under control
2. recognition, for each breakdown, of the primary breakdown, from the information known in step 1
3. attribution of the down time (or of any other element of evaluation chosen) to the primary breakdown and possibly, with the appropriate coefficients, to the other elements under control which, as a result of the primary breakdown, have either triggered an alarm, or have necessarily been affected by one of the primary or secondary breakdowns, even though they have not generated alarms themselves.

What is claimed is:

1. A fully automated system for monitoring operation on machine lines of interconnected logical systems, comprising three modules:

a module for knowledge of machine interactions of any type, capable of having repercussions at the level of breakdowns, between elements under control;

a module for recognizing, for each breakdown, a primary breakdown, from information contained in the module for knowledge; and a module for attributing down time to the primary breakdown and with the appropriate coefficients, for the primary breakdown and to the other elements under control which, as a result of the primary breakdown, have either triggered an alarm, or have necessarily been affected by one of the primary breakdown or a secondary breakdown, even though they have not generated alarms themselves.

2. The system according to claim 1, wherein the module for knowledge knows only some of the machine interactions, between only some of the elements under control.

3. The system according to claim 1, wherein the module for knowledge comprises a data bank into which functional links of the system have been entered.

4. The system according to claim 3, wherein the module for knowledge knows a functional layout of each element under control, upstream line, and downstream line, and can determine whether the source of the breakdown is internal or external.

5. A machine or machine line comprising a system according to claim 1.

6. A process for optimizing production, particularly in machine lines, comprising three steps:

(a) knowing machine interactions of any type, capable of having repercussions at the level of breakdowns, between elements under control;

(b) recognizing, for each breakdown, a primary breakdown, from information known in step (a); and (c) attributing down time to the primary breakdown and, with the appropriate coefficients, for the primary breakdown and to the other elements under control which, as a result of the primary breakdown, have either triggered an alarm, or have necessarily been affected by one of the primary breakdown or a secondary breakdown, even though they have not generated alarms themselves.

* * * * *